United States Patent
Wang (10) Patent No.: US 7,063,353 B2
(45) Date of Patent: Jun. 20, 2006

(54) LINEAR LOAD LIMITER APPARATUS AND METHOD

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 253 days.

(21) Appl. No.: 10/440,484

(22) Filed: May 16, 2003

(65) Prior Publication Data

US 2004/0227403 A1 Nov. 18, 2004

(51) Int. Cl.
*B60R 21/16* (2006.01)
(52) U.S. Cl. .................. 280/735; 280/806; 701/45
(58) Field of Classification Search ............... 280/735, 280/806; 701/45
See application file for complete search history.

(56) References Cited

U.S. PATENT DOCUMENTS

| | | | | |
|---|---|---|---|---|
| 5,358,275 A | | 10/1994 | Fohl | 280/806 |
| 5,533,756 A | * | 7/1996 | Dybro et al. | 280/806 |
| 5,904,730 A | * | 5/1999 | Yamazaki et al. | 701/301 |
| 6,076,856 A | | 6/2000 | Wang et al. | 280/806 |
| 6,102,439 A | | 8/2000 | Smithson et al. | 280/805 |
| 6,109,647 A | * | 8/2000 | Akaba et al. | 280/733 |
| 6,213,510 B1 | * | 4/2001 | Suyama | 280/805 |
| 6,598,904 B1 | * | 7/2003 | Nagata et al. | 280/807 |
| 6,758,495 B1 | * | 7/2004 | Brambilla et al. | 280/806 |
| 2002/0084646 A1 | | 7/2002 | Klingauf et al. | |

* cited by examiner

Primary Examiner—Paul N. Dickson
Assistant Examiner—Toan C. To
(74) Attorney, Agent, or Firm—Kathryn A. Marra (57) ABSTRACT

A method for coordinating the restraint forces provided by a seat belt load limiter and a vehicle airbag is provided. The method includes determining a desired total restraint force profile, determining the airbag force profile, and determining a desired seat belt force profile from the desired total restraint force profile and the airbag profile. The method preferably includes determining a load-limiting force profile sufficient to substantially achieve the desired seat belt force profile, and determining the profile of a load limiter system variable sufficient to substantially achieve the load-limiting force profile. A load limiter is also provided that is characterized by a variable load-limiting force. The load-limiter includes a tube characterized by a tube wall thickness, and a deformation apparatus slidably engaged in the tube for linear translation therein. The deformation apparatus is configured to plastically deform the tube during linear translation to generate a load-limiting force. The tube wall thickness varies over the length of the tube such that the load-limiting force varies during linear translation of the piston.

8 Claims, 6 Drawing Sheets

LINEAR LOAD LIMITER APPARATUS AND METHOD

TECHNICAL FIELD

This invention relates to methods of determining system variables for linear load limiters.

BACKGROUND OF THE INVENTION

Prior art vehicles employ various devices, including airbags and seat belts, to exert a restraint force in the event of a vehicle impact. Seat belt load limiters are employed in the prior art to regulate the restraint force provided by seat belts.

SUMMARY OF THE INVENTION

A method for coordinating the restraint forces provided by a seat belt load limiter and a vehicle airbag is provided. The method includes determining a desired total restraint force profile, determining the airbag force profile, and determining a desired seat belt force profile from the desired total restraint force profile and the airbag force profile. The method preferably includes determining a load-limiting force profile sufficient to substantially achieve the desired seat belt force profile, and determining the profile of a load limiter system variable sufficient to substantially achieve the load-limiting force profile.

A load limiter is also provided that is characterized by a variable load-limiting force. The load-limiter includes a tube characterized by a tube wall thickness, and a deformation apparatus slidably engaged in the tube for linear translation therein. The deformation apparatus is configured to plastically deform the tube during linear translation to generate a load-limiting force. The tube wall thickness varies over the length of the tube such that the load-limiting force varies during linear translation of the deformation apparatus.

A method of employing a mechanics model to calculate or otherwise determine at least one load limiter system variable is also provided. Use of the mechanics model reduces the quantity of testing and design iterations involved in the design of linear load limiters compared to the prior art.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
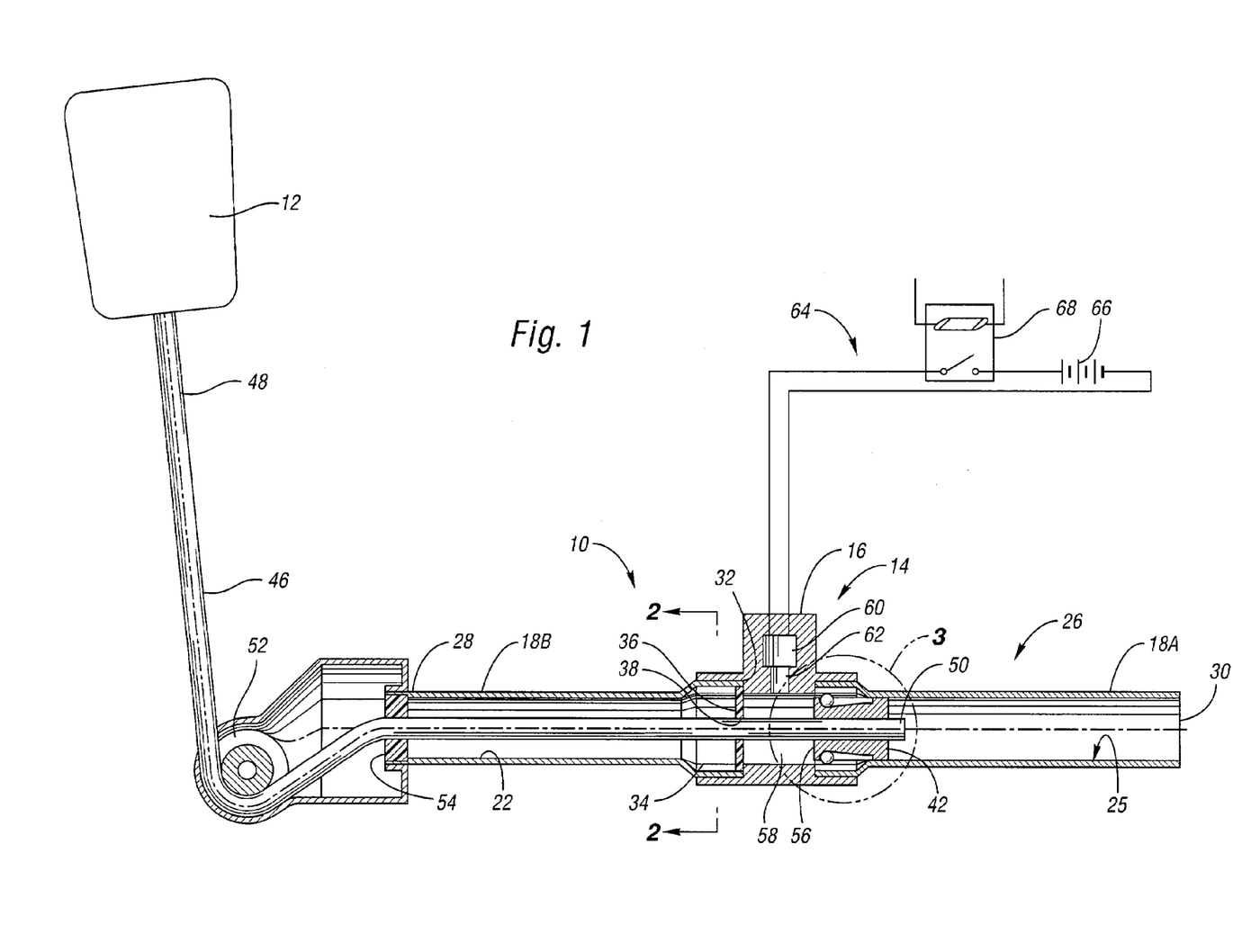
FIG. 1 is a schematic sectional side view of a belt tension and load limiter apparatus for a seat belt.
Figure 2:
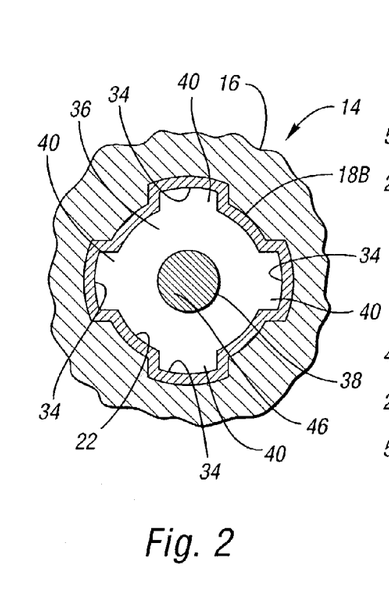
FIG. 2 is an enlarged schematic sectional view taken generally along the plane indicated by lines 2—2 in FIG. 1.
Figure 3:
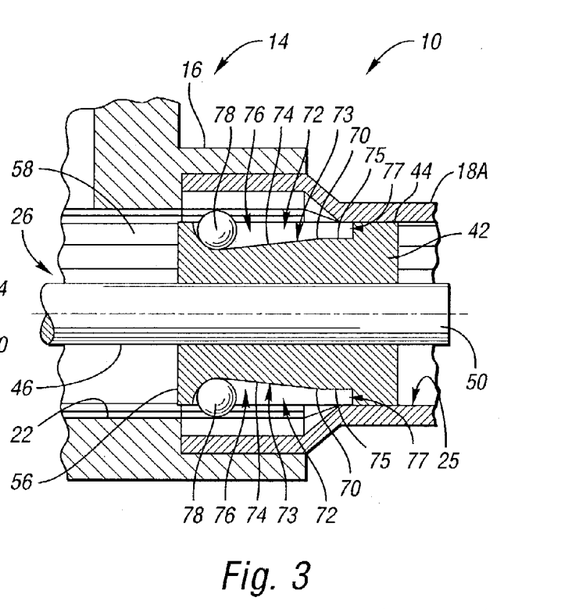
FIG. 3 is an enlarged view of the portion of FIG. 1 identified by reference circle 3.

Referring to FIGS. 1–3, a pretensioner and load limiter apparatus 10 is schematically depicted. The apparatus 10 is disposed between a body, not shown, of a motor vehicle and a seat belt buckle 12. A seat belt, not shown, has a latch plate at one end which plugs into the buckle 12 and a retractor on the vehicle body at the other end which winds and unwinds the seat belt. A stationary housing 14 of the belt tension and energy absorbing apparatus is rigidly attached to the vehicle body and includes a center tube portion 16. An upper tube section 18A and a lower tube section 18B are rigidly attached to the center tube portion on opposite sides thereof. The upper and lower tube sections 18A, 18B and the center tube portion 16 are connected such that they cooperate to define a cylindrical passage 22 having inner surface 25. In the context of the present invention, a "tube" may be a one-piece tube or a plurality of elements that cooperate to form a passage. Thus, the upper and lower tube sections and the center tube portion define a stationary tube 26 on the vehicle body having a first end 28 and a second end 30.

The lower tube section 18B is locally radially expanded at an end 32 thereof to define a plurality of inward facing linear grooves 34. A disc-shaped bulkhead 36 in the lower tube section 18B between the ends 28, 30 of the stationary tube 26 has a center aperture 38 and a plurality of lugs 40. The bulkhead bears against a shoulder on the center tube portion 16 with the lugs 40 seated in respective ones of the inward-facing linear grooves 34.

A piston 42 located within, and slidably engaged with, the stationary tube 26 has a cylindrical outside surface 44, which cooperates with inner surface 25 in supporting the piston in the stationary tube for linear translation therein. A connecting member 46 has a first end 48 attached to the seat belt buckle 12 and a second end 50 attached to the piston 42 in a bore in the latter. The connecting member 46 traverses a guide roller 52 on the vehicle body, a guide bushing 54 at the end 28 of the stationary tube 26, and the aperture 38 in the bulkhead 36.

The bulkhead 36 cooperates with a side 56 of the piston 42 in defining a pressure chamber 58 in the stationary tube 26 around the connecting member 46. A schematically represented gas generator 60 in the center tube portion 16 has a port 62 exposed to the pressure chamber 58 and an electrical ignition circuit 64 including a battery 66 and an acceleration responsive switch 68. When the acceleration responsive switch 68 is closed, gas at elevated pressure is produced in the gas generator 60 and introduced into the pressure chamber 58 through the port 62.

As seen best in FIGS. 1 and 3, the cylindrical outer surface 44 of the piston 42 is interrupted by a plurality of slots 70 which face the inner surface 25 of the tube 26 and cooperate therewith in defining a corresponding plurality of rolling element chambers 72. Each rolling element chamber 72 is partially defined by a ramp surface 73 that faces the inner surface 25. The ramp surface 73 includes an inclined, or sloped, segment 74, and a flat segment 75. The distance between each ramp surface 73 and the inner surface 25 is greater at a first, or deep, end 76 of the rolling element chamber 72 than at a second, or shallow, end 77 of the rolling element chamber 72. The flat segment 75 is part of the shallow end 77.

A plurality of spherical rolling elements 78 are disposed in respective ones of the rolling element chambers 72. The diameter of each of the spherical rolling elements 78 is less than the depth of the corresponding rolling element chamber 72 at the deep end 76 thereof and is greater than the depth of the shallow end 77 of the corresponding rolling element chamber. The rolling elements 78 are made of a material, e.g. steel, having a hardness exceeding the hardness of the material from which the center tube portion and upper and lower tube segments are made but not exceeding the hardness of the material from which the piston 42 is made.

The seat belt is typically loosely draped over an occupant of the motor vehicle for maximum comfort. At the same time, the rolling elements 78 are located at the deep ends 76 of the rolling element chambers 72 where they have minimal contact with the upper and lower tube sections 18A, 18B. Friction, including friction between the connecting member 46 and the guide roller 52, maintains the connecting member 46 and the seat belt buckle 12 stationary while the aforesaid seat belt retractor winds and unwinds the seat belt in conventional fashion for occupant comfort.

In the circumstance that the motor vehicle impacts an object, the corresponding very rapid deceleration of the vehicle body causes the aforesaid seat belt retractor to lock and the acceleration responsive switch 68 to close. When the switch 68 closes, gas at elevated pressure produced in the gas generator 60 is introduced into the pressure chamber 58 through the port 62. The gas propels the piston 42 in a first direction toward the end 30 of the stationary tube 26 through a relatively short tension stroke during which the piston, through the connecting member 46, pulls the seat belt buckle 12 down to snugly tighten the seat belt around the occupant.

The bulkhead 36 fits tightly in the lower tube section 18B and around the connecting member 46 to minimize leakage of gas from the pressure chamber 58 and to prevent the pressure force applied by the gas in the pressure chamber from displacing the bulkhead in the stationary tube. The piston 42 is relatively close to the bulkhead 36 at the onset of the tension stroke of the piston so that the volume of the pressure chamber is small and only a correspondingly small volume of gas at elevated pressure is required to fill the pressure chamber and propel the piston through its tension stroke.

At the conclusion of the tension stroke of the piston 42, the occupant of the motor vehicle is thrust against the seat belt due to the vehicle body decelerating more rapidly than the occupant. With the aforesaid seat belt retractor locked, the thrust of the occupant on the seat belt is transferred through the seat belt buckle 12 and the connecting member 46 to the piston 42 and propels the piston in a second direction toward the end 28 of the stationary tube 26 through an energy absorbing stroke. At the onset of the energy absorbing stroke of the piston, the rolling elements 78 traverse the ramp surfaces 73 of the rolling element chambers 72 and become interference fitted in the shallow ends 77 between the flat segments 75 and the inner surface 25. During subsequent linear translation of the piston 42 in the stationary tube 26, the rolling elements plastically deform the center and upper and lower tube sections 16, 18A, 18B by penetrating the wall of the tube 26 and plowing grooves therein. The piston and the rolling elements therefore constitute a deformation apparatus that absorbs energy by converting into work a fraction of the kinetic energy of the occupant of the motor vehicle and provides a resistive, load-limiting force to the buckle and the seat belt. The hardness of the rolling elements does not exceed the hardness of the piston; therefore the piston is not plastically deformed by the rolling elements during the energy absorbing stroke of the piston.

The energy absorbing stroke of the piston 42 may overlap the bulkhead 36 in the stationary tube 26 because the piston engages and displaces the bulkhead during its energy absorbing stroke, e.g. by fracturing the bulkhead. Accordingly, the length of the energy absorbing stroke of the piston exceeds the combined lengths of the pressure chamber 58 and the tension stroke of the piston and may include substantially the full length of the upper and lower tube sections. Because the length of the energy absorbing stroke of the piston is independent of the length of the pressure chamber 58, the volume of the pressure chamber can be optimized for the tension stroke of the piston without compromising the energy absorbing stroke of the piston. By optimizing the volume of the pressure chamber for the tension stroke of the piston, the volume of gas at elevated pressure required to propel the piston through its tension stroke and the expense attributable to producing that volume of gas at elevated pressure are minimized.

A mechanics model can be used to predict the load-limiting force and describe the relationships among system variables including the wall thickness of the tube, rolling element diameter, penetration depth of the rolling elements into the wall of the tube ("tube wall"), tube material strength and friction coefficient. The model describes the energy dissipated in the primary deformation modes and other energy absorbing modes in the groove-plowing process. The load-limiting force may then be calculated from the balance of internal work and external work.

Three primary energy absorbing modes are involved: (i) membrane extension due to extrusion; (ii) bending transition at the forefront of the plowing; and (iii) friction between the tube wall and the rolling elements. The energy dissipated in these three modes can be approximated with the help of the following assumptions: (1) strain-rate effect is negligible assuming a sufficiently low loading rate; (2) in the calculation of membrane and bending deformations, the rolling element plows through a flat plate instead of a tube since the diameter of the rolling elements is small compared to the diameter of the tube; (3) tube wall thickness is small compared to its diameter so thin-wall structure theory can be applied; (4) penetration depth is smaller than the rolling element radius (this is actually a design constraint for maintaining a stable plowing action, rather than an assumption); (5) for mild steel the deformation is mainly in the plastic yielding range with a constant yield stress, so the rigid-perfectly-plastic material model is used, and the elastic part and strain-hardening part is neglected; and (6) inertial effects are also neglected because of the small moving mass involved.

Figures 4, 5, 6:
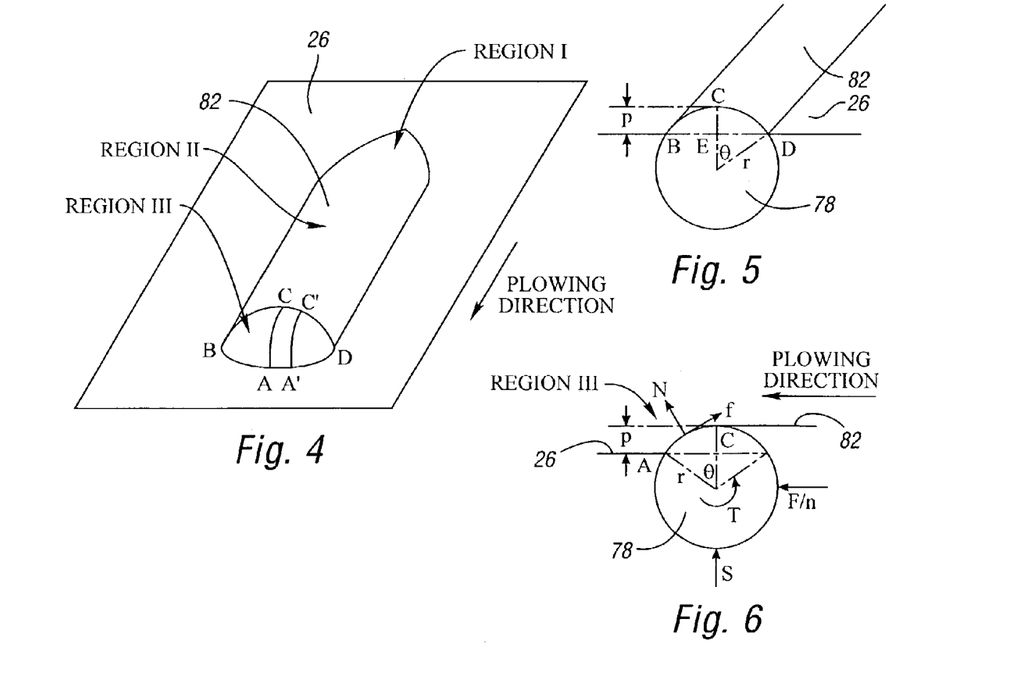
FIG. 4 is a schematic perspective view of a groove plowed in a load limiter apparatus tube wall.
FIG. 5 is a schematic perspective view of the load limiter apparatus tube wall depicted in FIG. 4 and a rolling element forming the groove.
FIG. 6 is a schematic side view of the rolling element and tube wall of FIG. 5.

Referring to FIG. 4, a groove 82 plowed by a rolling element in the tube wall is schematically depicted. In accordance with the aforementioned assumptions, the tube wall is depicted as a flat plate. The groove 82 is characterized by three regions, each region corresponding to a stage in the deformation process. Region I is the beginning part of the groove formed during the initial penetration process in which a rolling element first penetrates the tube wall. It corresponds to the initial load-limiting force before the load limiting force has reached the full plowing force level. Region II is a cylindrical portion formed after a rolling element completes the process of penetrating the tube wall. Region III, also referred to herein as the "transition stage," is the region at which a rolling element deforms the tube wall. Region III conforms to the shape of a portion of a corresponding rolling element, and is therefore shaped like a portion of a sphere. Arc BAD is the border between deformed and undeformed tube wall; arc BCD is the border between fully deformed tube wall and partially deformed tube wall. The process of deformation occurs between arcs BAD and BCD.

FIG. 5, wherein like reference numbers refer to like components from FIGS. 1–4, schematically depicts the effects of membrane extension due to extrusion. Prior to deformation by a rolling element 78, the tube wall 26 is initially flat, i.e. the straight line BED. After the transition stage it is deformed into arc BCD. Neglecting the details in the transition stage, the membrane strain can be approximated from the increase in length from line BED to arc BCD:

$$\varepsilon = \frac{l_{BCD} - l_{BED}}{l_{BED}} = \frac{2r\theta - 2r\sin\theta}{2r\sin\theta} = \frac{\theta}{\sin\theta} - 1 \tag{1}$$

where r is radius of the rolling elements and $\theta$ can be determined from r and the penetration depth p by the following geometric relationship:

$$\cos\theta = \frac{r-p}{r} = 1 - \frac{p}{r} \tag{2}$$

The design space of the penetration depth is bounded by the radius of the rolling element as shown in Equation 3:

$$0 < p \leq r \tag{3}$$

Substituting Eq. (3) into Eq. (2), the design space of the angle $\theta$ is also bounded:

$$0 < \theta \leq \frac{\pi}{2} \tag{4}$$

For a rigid-perfectly-plastic tube material with yield stress $\sigma_0$, the membrane plastic work dissipated over a stable plowing distance $\Delta$ can be estimated using the expression below:

$$W_m = \sigma_0 \varepsilon l_{BED} t \Delta = 2r\sigma_0 t (\theta - \sin\theta)\Delta \tag{5}$$

where t is thickness of the tube wall.

Referring to FIGS. 4 and 5, bending deformation can be estimated in its two principle directions: (1) about the axial direction of the tube, in which the flat plate BED is bent into the cylindrical surface BCD with a radius of curvature r; and (2) about the direction transverse to the tube axial direction, i.e., perpendicular to the tube axis, in which the arc AC (the extrusion) and its family arcs are formed in Region III. Bending and re-bending (bending back) occur during the process because the curvature along arc AC starts from 0 (prior to point A), to 1/r (on arc AC), and finally back to 0 (after point C).

The formation of the cylindrical BCD includes three parts: the bending angle $\theta$ between the tangential direction of the cylindrical surface and the flat plate at point D, similarly another bending angle $\theta$ at point B, and the bending angle $2\theta$ along the arc BCD. Accordingly, the total bending angle is $4\theta$ about the tube axial direction. For a rigid-perfectly-plastic material, the plastic bending work per unit width is equal to the fully plastic bending moment, $$M_0 = \frac{1}{4}\sigma_0 t^2,$$

multiplied by its bending angle. Therefore, over the plowing distance $\Delta$, the plastic work in bending about the tube axial direction becomes $$W_{b1} = 4M_0\theta\Delta \tag{6}$$

In the direction perpendicular to the tube axis in Region III, the bending deformation along the arc AC and its parallel family arcs, e.g., A'C', is considered. Arc A'C' has a greater curvature (i.e. smaller radius of curvature) than arc AC, but with a shorter arc length. Since the curvature is an increasing factor to bending work, and since the arc length possesses an opposite trend, they tend to cancel each other. Therefore, it can be assumed that all family arcs parallel to the arc AC in Region III have equal contribution to the total bending work. Similar to the analysis of bending along arc BCD, prior to and after point A, the bending angle $\theta$ is formed in the tangential direction of arc AC at point A, and along the arc AC another bending angle $\theta$ is observed. Prior to and after point C, the curvature changes from 1/r to 0 and all other family arcs involve in a similar change in the curvature (the amount is different though). All the family arcs parallel to the arc AC end at the arc BCD whose length is $2r\theta$. The total plastic bending work in the direction perpendicular to the tube axial direction is approximated below:

$$W_{b2} = \Delta(M_0\theta)_A + \Delta(M_0\theta)_{AC} + \Delta\left(M_0\frac{1}{r}2r\theta\right)_C = 4M_0\theta\Delta \tag{7}$$

The total plastic work in bending is the sum of Equations (6) and (7):

$$W_b = W_{b1} + W_{b2} = 8M_0\theta\Delta = 2\sigma_0 t^2\theta\Delta \tag{8}$$

Referring to FIG. 6, wherein like reference numbers refer to like components from FIGS. 1–5, friction force develops between the tube wall 26 and the rolling elements 78 on the contact surface in Region III. The torque T and the vertical component S of the force exerted by the piston on the rolling element do not contribute to friction work over the plowing distance. Assuming that the resultant friction force f and the resultant contact force N are applied at the mid-point of the arc AC, we see that the line of the contact force N bisects angle $\theta$. Plowing force F (also called the load-limiting force) is in the axial direction of the tube and the force balance in that direction is $$\frac{F}{n} = f\cos\frac{\theta}{2} + N\sin\frac{\theta}{2} \qquad (9)$$

where n is the number of the rolling elements.

Using Eq. (9) and relation f=μN where μ is friction coefficient, the friction force can be expressed as:

$$f = \frac{F}{n\left(\cos\frac{\theta}{2} + \frac{1}{\mu}\sin\frac{\theta}{2}\right)} \qquad (10)$$

The work done by the friction force on one rolling element over the plowing distance is $$W_f = f\Delta = \frac{F\Delta}{n\left(\cos\frac{\theta}{2} + \frac{1}{\mu}\sin\frac{\theta}{2}\right)} \qquad (11)$$

The balance of internal work and external work of all the rolling elements gives $$F\Delta = n(W_m + W_b + W_f) \qquad (12)$$

where the left side of the equation is the external work done by the plowing force and the right side is the total internal work. Substituting Eqs. (5), (8) and (11) into Eq. (12) and solving for F, we obtain $$F = \frac{2n\sigma_0 t[\theta t + r(\theta - \sin\theta)]}{g(\theta, \mu)} \qquad (13)$$

where (14)

$$g(\theta, \mu) = 1 - \frac{1}{\cos\frac{\theta}{2} + \frac{1}{\mu}\sin\frac{\theta}{2}}$$

Referring again to FIG. 1, the load-limiting force generated by the load limiter apparatus 10 and its relationship to various system variables can be described and predicted using Equation 13. In the context of the present invention, a "system variable" is a design variable that affects the magnitude of the load-limiting force. Thus, the yield strength of the tube material, the quantity of rolling elements, the radius of rolling elements, the penetration depth, the tube wall thickness, and the coefficient of friction between the rolling elements and the tube wall are system variables. Equation 13 is a design tool that can be employed to develop a load limiter apparatus 10 with a desired load-limiting force magnitude. In other words, Equation 13 may be employed to determine the appropriate values of system variables at each point along the energy absorbing stroke to achieve a desired load limiting force.

More specifically, the process of designing a load limiter having a desired load limiting force may be facilitated by selecting values of system variables such that the relationship described by Equation 13 is substantially satisfied, where F is the desired load limiting force. For example, it may be desirable for the load-limiting force to remain substantially constant as the piston travels through the energy-absorbing stroke. However, the thickness of the tube wall is greater in the center tube portion 16 and where the upper and lower tube sections 18A, 18B are partially inserted into the center tube portion (i.e., the tube wall thickness is the combined thickness of one of the upper and lower tube sections and the center tube portion). Thus, since tube wall thickness is one of the system variables that determines the load-limiting force, and since the tube wall thickness differs at the center tube portion from the rest of the load limiter apparatus 10, another system variable must differ at the center tube portion to maintain a constant load-limiting force across the energy absorbing stroke.

Equation 13 may be employed to determine the appropriate value of the penetration depth at the central tube portion to maintain the same load-limiting force achieved at the upper and lower tube sections. Using known or preselected values of yield strength, radius, coefficient of friction, quantity of rolling elements, and tube wall thickness, the penetration depth sufficient to substantially achieve the desired load limiting force can be determined according to the relationship described by Equation 13 by, for example, calculating, or solving for, the penetration depth p. Accordingly, the penetration depth is smaller at the central tube portion than the upper and lower tube sections. This is accomplished by designing the load limiter apparatus such that the diameter of the passage 22 at the center tube portion is slightly greater than the diameter of the passage at the first and second ends 28, 30. Thus, the resistance to rolling or plowing of the rolling elements 78 remains substantially constant as the piston and the rolling elements traverse the passage 22.

Figure 7:
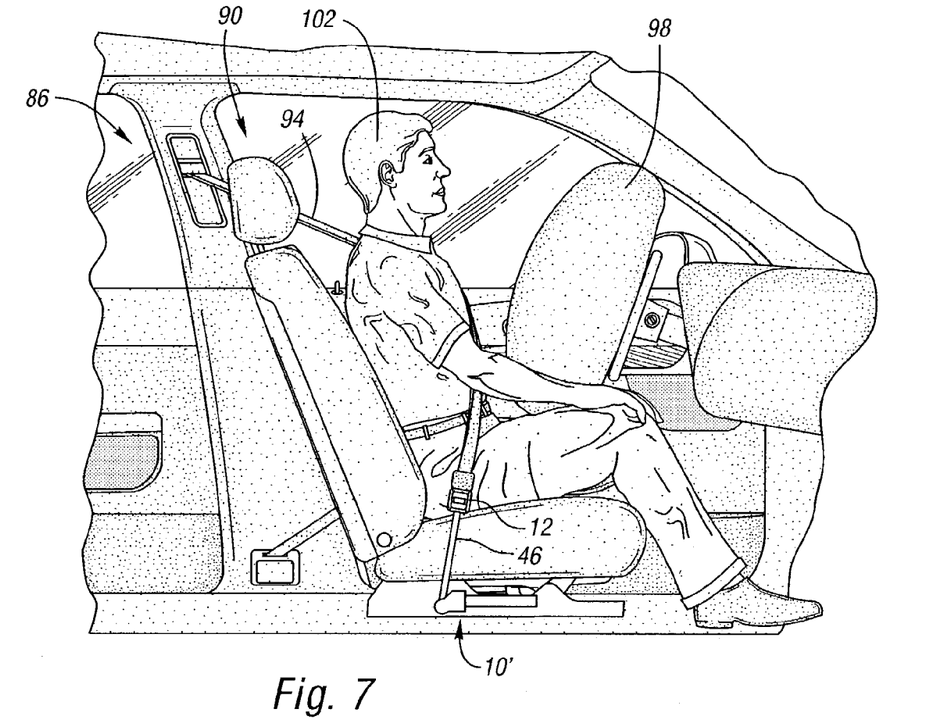
FIG. 7 is a schematic side view of a vehicle having an airbag, a seat belt, and a seat belt load limiter apparatus.

Referring to FIG. 7, wherein like reference numbers refer to like components from FIGS. 1–6, a load limiter apparatus 10' is employed in a vehicle 86 having a vehicle seat 90, a seat belt 94, and an airbag 98. In the event of a vehicle impact, the seat belt 94 exerts a force on an occupant 102, a component of which is the load limiting force from the load limiter apparatus 10'. The airbag 98 also exerts a force on the occupant 102 that varies with respect to time in the event of a vehicle impact. It may be desirable for the load-limiting force to vary with respect to time to compensate for the force exerted by the airbag.

The piston (not shown) translates linearly during an impact event, that is, the piston moves over time with the movement of the occupant. Thus, the piston is movable between a starting position and an ending position during an energy absorbing stroke, with multiple positions therebetween, each of the piston positions corresponding to a moment in time during a vehicle impact event and to an occupant position. The piston position may be described by the displacement of the piston from its starting position in the energy absorbing stroke. The load-limiting force is dependent upon the tube wall thickness at each of the piston positions. Therefore, by making a load-limiter system variable, such as tube wall thickness, vary across the energy absorbing stroke, the load-limiting force can vary with piston position, time, and occupant position. The mechanics model may be advantageously employed to facilitate the design of a multistage linear load limiter.

Figure 8:
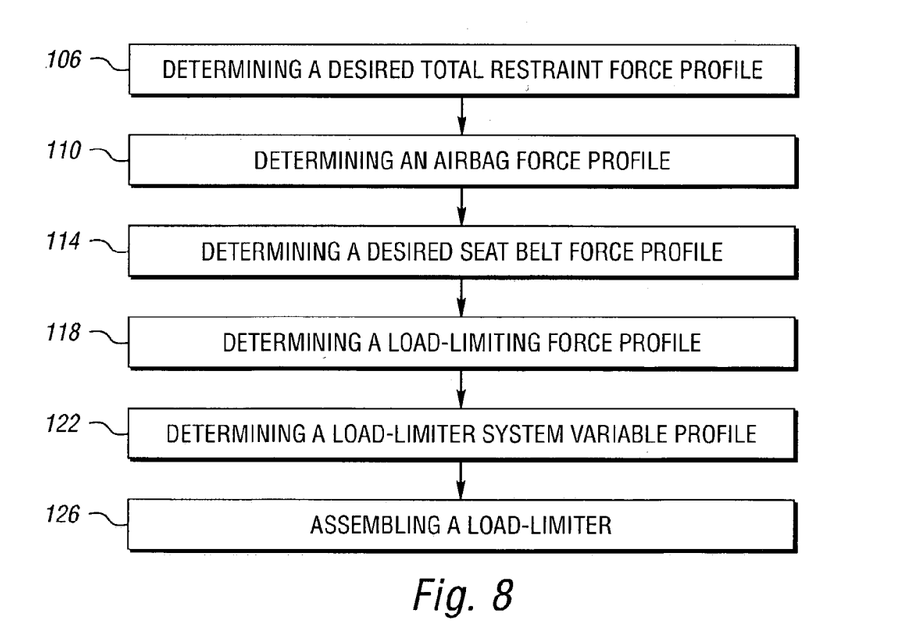
FIG. 8 is a flow chart depicting a method for optimizing the interaction between the airbag, seat belt, and seat belt load limiter apparatus of FIG. 7.
Figure 9:
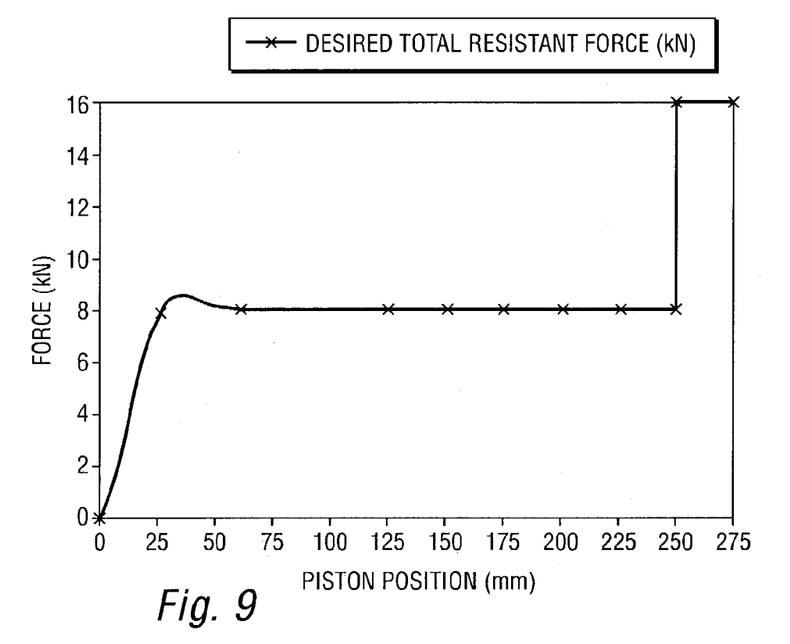
FIG. 9 is a diagram illustrating an exemplary total restraint force profile.

Referring to FIG. 8, a method for optimizing the interaction between an airbag, a seat belt, and a seat belt load limiter is depicted. The method includes determining a desired total restraint force profile 106. FIG. 9 depicts an exemplary desired total restraint force profile. The total restraint force profile describes a desired total restraint force exerted on an occupant for each of a plurality of values of an impact-related variable, such as piston displacement from the beginning of the energy absorption stroke, or piston position with respect to the tube, as shown. The total restraint force is the sum of the airbag force and the seat belt force. Note that the reason to specify a relatively high force for the last portion of the stroke (from 250 to 275 mm) is to ensure the locking of the load-limiter at the end of its load-limiting operation.

Figure 10:
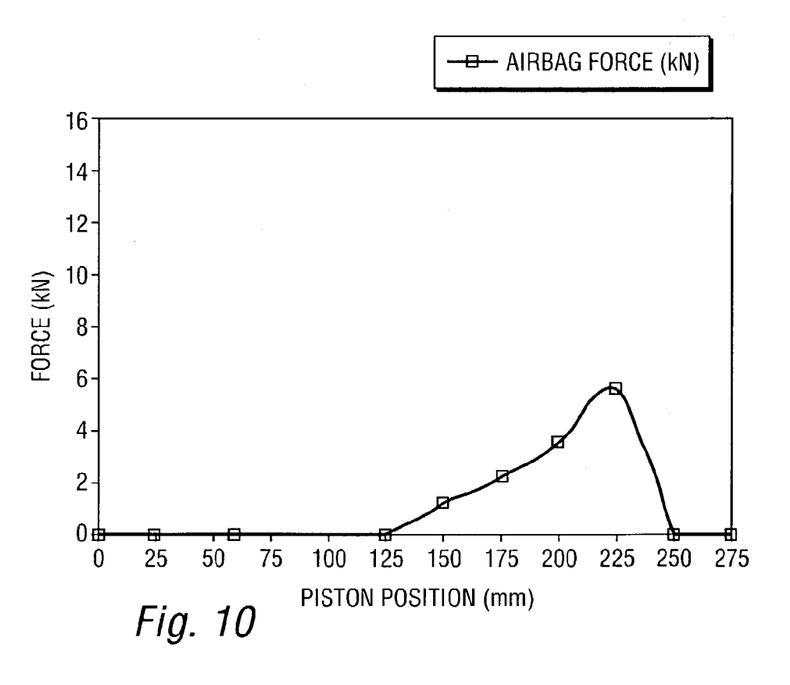
FIG. 10 is a diagram illustrating the airbag force profile of the airbag of FIG. 7.

Referring again to FIG. 8, the method also includes determining an airbag force profile 110. FIG. 10 depicts an exemplary airbag force profile, i.e., an exemplary relationship between airbag force exerted on the occupant and piston position during the energy absorbing stroke. For each of the plurality of piston positions, there is a corresponding airbag force magnitude.

Figure 11:
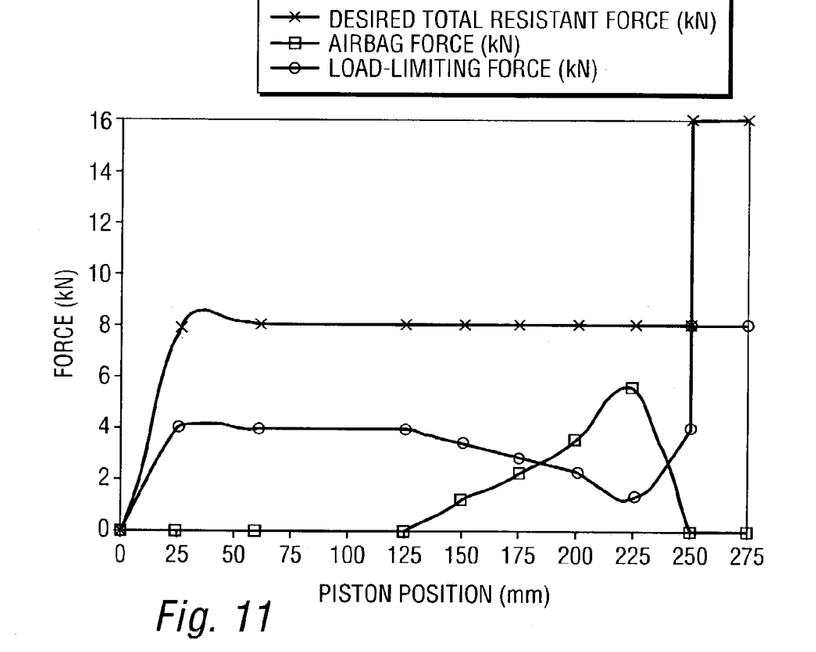
FIG. 11 is a diagram illustrating the load-limiting force profile that substantially results in the desired total restraint force profile of FIG. 9.

Referring again to FIG. 8, the method also includes determining a desired seat belt force profile 114 that describes, for each of the plurality of piston positions, a corresponding desired seat belt force. The desired seat belt force profile is determined by, for each of the plurality of piston positions, subtracting the corresponding airbag force from the corresponding total restraint force. The method may also include determining a desired load-limiting force profile for a load limiter 118. The desired load limiting force profile can be estimated by, for each of the plurality of piston positions, dividing the corresponding total seat belt force by two (assuming that the total seat belt force acting on the occupant is the sum of belt webbing forces from both the buckle and retractor). FIG. 11 depicts the result of the above mathematical operations, that is, a desired load limiting force profile describing, for each of a plurality of piston positions, the desired load-limiting force.

Referring again to FIG. 8, the method may also include determining a profile of a load-limiter system variable 122. The profile of the load-limiter system variable describes, for each of the plurality of piston positions, a value of the system variable sufficient to substantially achieve the corresponding desired load-limiting force magnitude. The system variable profile is preferably determined by determining, for each of the plurality of piston positions, a system variable value such that the relationship described by Equation 13 is satisfied. Tube wall thickness is preferably the system variable for which a profile is determined.

Rewriting Eq. (13) into the quadratic form with the tube wall thickness as the variable, we have $$At^2 + Bt + C = 0 \quad (15)$$

where $$A = 2n\sigma_0 \theta \quad (16)$$

$$B = 2n\sigma_0 r(\theta - \sin\theta) \quad (17)$$

and $$C = -g(\theta,\mu)F \quad (18)$$

Solving Eq. (15) we obtain the desired tube wall thickness:

$$t = \frac{-B + \sqrt{B^2 - 4AC}}{2A} \quad (19)$$

Figure 12:
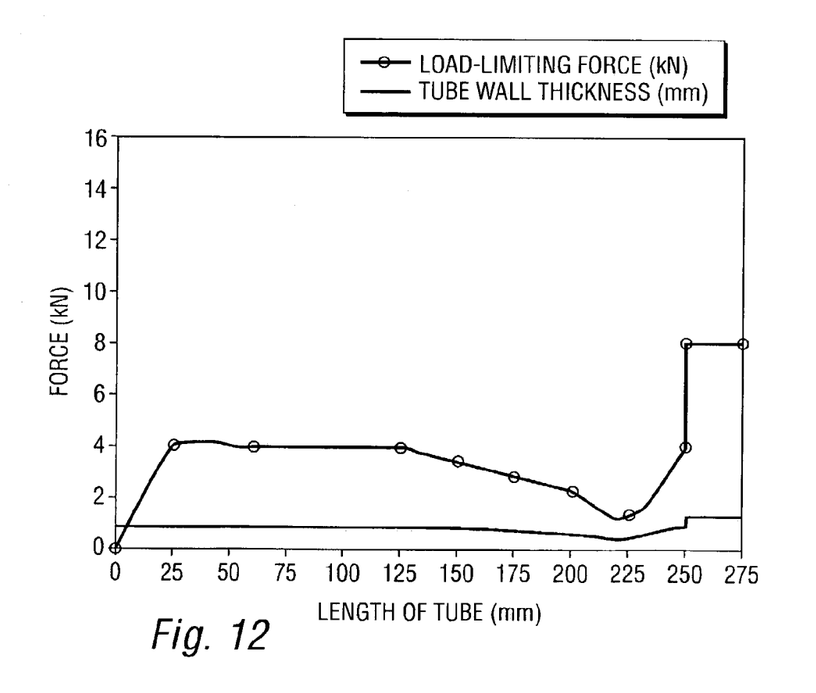
FIG. 12 is a diagram illustrating a tube wall thickness profile that substantially results in the load-limiting force profile of FIG. 11.
Figure 13:
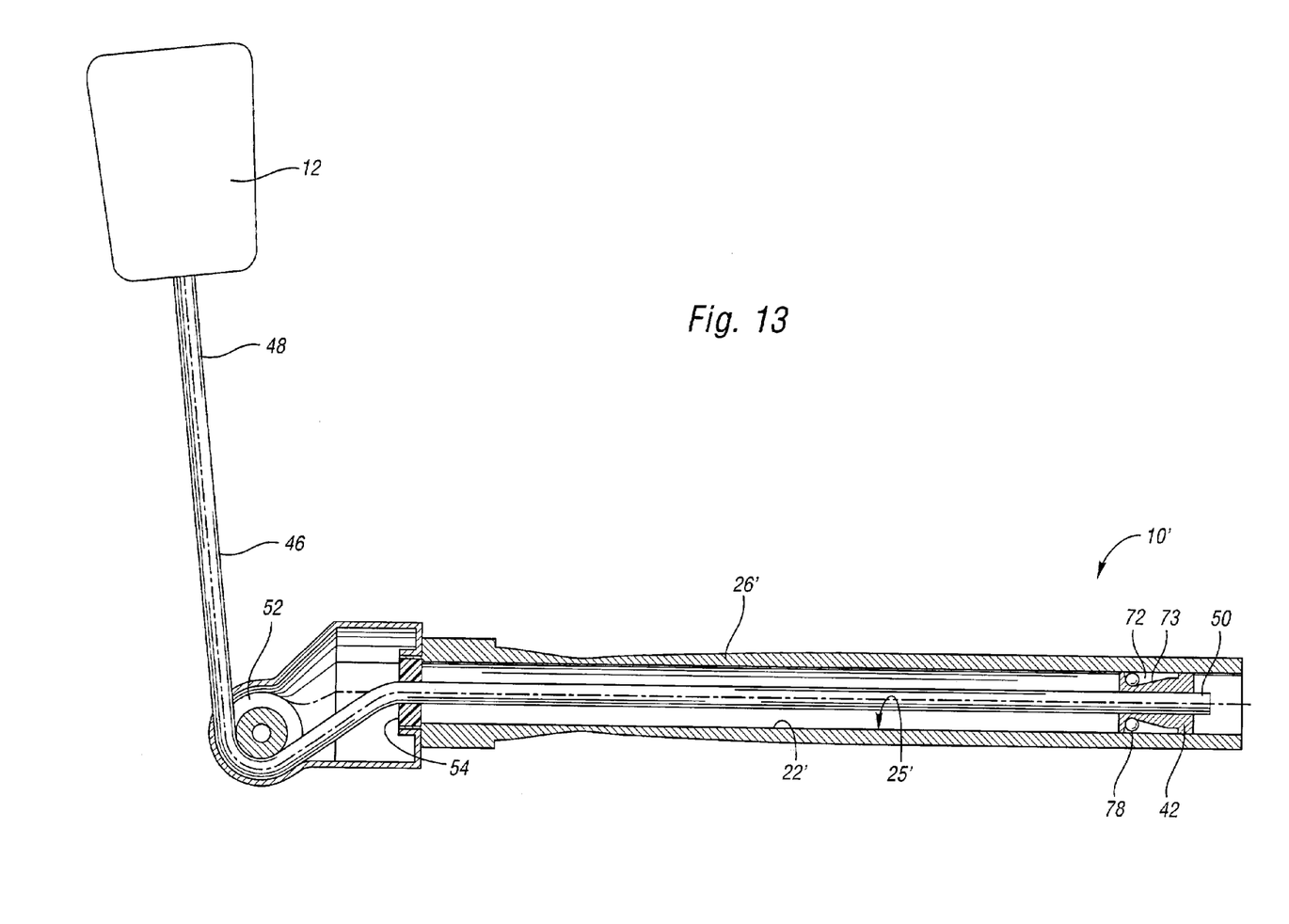
FIG. 13 is a schematic sectional side view of the load limiter apparatus of FIG. 7 having the tube wall thickness profile of FIG. 12.

Finally, the tube wall thickness necessary to achieve the desired load limiting force at each of the piston positions can be calculated by employing Equation 19 to calculate a tube wall thickness profile. Referring to FIG. 12, a tube wall thickness profile calculated using Equation 19 is depicted. The tube wall thickness profile describes a tube wall thickness for each of the plurality of piston positions, where n=3, μ=0.3, $\sigma_0$=320 MPa, p=1.06 mm, and r=1.5875 mm. Referring to FIG. 13, wherein like reference numbers refer to like components from FIGS. 1–3 and 7, the load-limiter 10' of FIG. 7 is schematically depicted (not to scale). The load-limiter 10' of FIG. 13 is substantially similar to the load limiter apparatus 10 of FIGS. 1–3, except that load limiter 10' employs a one-piece tube 26' of varying tube wall thickness, and does not include a pretensioning device employing pressurized gas. Accordingly, in the context of the present invention, a "piston" may or may not compress or move a fluid, or transform energy imparted by a fluid. For example, a "piston" may include any device or object engaged within a tube for translation therein. The tube 26' conforms to the tube wall thickness profile of FIG. 12 so that the total restraint force exerted upon the occupant substantially follows the force profile of FIG. 9. Correspondingly, as shown in FIG. 8, the method may further include assembling a load-limiter having a tube substantially conforming to the tube wall thickness profile 126.

While the best modes for carrying out the invention have been described in detail, those familiar with the art to which this invention relates will recognize various alternative designs and embodiments for practicing the invention within the scope of the appended claims.

The invention claimed is:

1. A method for optimizing the interaction between an airbag, a seat belt, and a seat belt load limiter in a vehicle impact, the method comprising:
   determining a desired total restraint force profile, the desired total restraint force profile describing a desired total restraint force exerted on a vehicle occupant for each of a plurality of values of an impact-related variable;
   determining an airbag force profile, the airbag force profile describing the force exerted by the airbag on the occupant for each of the plurality of values of the impact-related variable; and
   determining a desired seat belt force profile describing a desired seat belt force exerted on the occupant for each of the plurality of values of the impact-related variable, the step of determining the desired seat belt force profile including, for each of the plurality of values of the impact-related variable, subtracting the corresponding airbag force from the corresponding desired total restraint force.

2. The method of claim 1, wherein the method further comprises determining a desired load-limiting force profile for the seat belt load limiter, the desired load-limiting force profile describing a desired load limiting force magnitude (F) exerted on the seat belt by the load limiter for each of the plurality of values of the impact-related variable, the desired load limiting force being a component of the corresponding desired seat belt force.

3. The method of claim 2, wherein the load limiter includes a tube characterized by a tube wall thickness (t) and comprised of a material having a yield strength ($\sigma_0$); a piston supported in the tube for linear translation within the tube between a plurality of positions relative to the tube during an energy absorbing stroke; at least one ramp on the piston; and a quantity (n) of rolling elements having radius (r) located between said at least one ramp and said tube;
   wherein the load limiting force is attributable to, daring the energy absorbing stroke of the piston, each of the quantity of rolling elements plastically deforming the tube by plowing a groove therein at a penetration depth (p), and friction between the tube and the quantity of rolling elements, the tube and the quantity of rolling elements having a coefficient of friction (μ).

4. The method of claim 3, wherein the impact-related variable is the displacement of the piston during the energy absorbing stroke; wherein each of the plurality of values of the impact-related variable corresponds to a piston position relative to the tube; and wherein the method further comprises determining a system variable profile that describes a value of a load-limiter system variable at each of the plurality of piston positions sufficient to substantially achieve the corresponding desired load limiting force.

5. The method of claim 4, wherein the system variable is tube wall thickness.

6. The method of claim 5, wherein said determining a load-limiter system variable profile includes calculating the tube wall thickness at each of the plurality of piston positions according to the relationship $$t = \frac{-B + \sqrt{B^2 - 4AC}}{2A},$$

where
$A = 2n\sigma_0\theta$, $B = 2n\sigma_0 r(\theta - \sin\theta)$, $C = -g(\theta,\mu)F$, $$g(\theta, \mu) = 1 - \frac{1}{\cos\frac{\theta}{2} + \frac{1}{\mu}\sin\frac{\theta}{2}}, \text{ and } \theta = \cos^{-1}\left[1 - \frac{p}{r}\right].$$

7. The method of claim 6, further comprising assembling a load limiter apparatus having a rube conforming to the tube wall thickness profile.

8. A method for designing a load-limiter apparatus, the method comprising:

determining a desired load-limiting force magnitude (F) for the load-limiter apparatus, the load-limiter apparatus having a tube characterized by a tube wall thickness (t) and comprised of a material having a yield strength ($\sigma_0$); a piston supported in the tube for linear translation within the tube; at least one ramp on the piston; and a quantity (n) of rolling elements having radius (r) located between said at least one ramp and said tube; wherein the load limiting force is attributable to, during the energy absorbing stroke of the piston, each of the quantity of rolling elements plastically deforming the tube by plowing a groove therein at a penetration depth (p), and friction between the tube and the quantity of rolling elements, the tube and the quantity of rolling elements having a coefficient of friction (μ); and selecting the value of at least one of the yield strength, quantity of rolling elements, radius of rolling elements, penetration depth, rube wall thickness, and coefficient of friction such that the relationship $$F = \frac{2n\sigma_0 t[\theta t + r(\theta - \sin\theta)]}{g(\theta, \mu)},$$

where $$g(\theta, \mu) = 1 - \frac{1}{\cos\frac{\theta}{2} + \frac{1}{\mu}\sin\frac{\theta}{2}} \text{ and } \theta = \cos^{-1}\left[1 - \frac{p}{r}\right],$$

is substantially satisfied.

* * * * *